US006904218B2

(12) United States Patent
Sun et al.

(10) Patent No.: US 6,904,218 B2
(45) Date of Patent: Jun. 7, 2005

(54) SUPER-LARGE-EFFECTIVE-AREA (SLA) OPTICAL FIBER AND COMMUNICATION SYSTEM INCORPORATING THE SAME

(75) Inventors: Yi Sun, Duluth, GA (US); David W. Peckham, Lawrenceville, GA (US); Fengqing Wu, Duluth, GA (US)

(73) Assignee: Fitel U.S.A. Corporation, Norcross, GA (US)

( * ) Notice: Subject to any disclaimer, the term of this patent is extended or adjusted under 35 U.S.C. 154(b) by 228 days.

(21) Appl. No.: 10/435,855

(22) Filed: May 12, 2003

(65) Prior Publication Data

US 2004/0228593 A1 Nov. 18, 2004

(51) Int. Cl.[7] ............................................. G02B 6/22
(52) U.S. Cl. ..................................... 385/127; 385/123
(58) Field of Search ................................. 385/123–129

(56) References Cited

U.S. PATENT DOCUMENTS

| | | | |
|---|---|---|---|
| 5,715,346 A | | 2/1998 | Liu |
| 5,781,684 A | | 7/1998 | Liu |
| 6,611,647 B2 | * | 8/2003 | Berkey et al. ............... 385/123 |
| 2003/0210877 A1 | * | 11/2003 | Berkey et al. ............... 385/123 |
| 2004/0033040 A1 | * | 2/2004 | Takahasi et al. ............. 385/123 |
| 2004/0105642 A1 | * | 6/2004 | Bickham ..................... 385/127 |
| 2004/0126074 A1 | * | 7/2004 | Bickham et al. ............. 385/127 |
| 2004/0218882 A1 | * | 11/2004 | Bickham et al. ............. 385/127 |

FOREIGN PATENT DOCUMENTS

| | | |
|---|---|---|
| EP | 1 107 027 A1 | 6/2001 |
| EP | 1 120 671 A1 | 8/2001 |
| EP | 1 130 426 A1 | 9/2001 |
| EP | 1 233 288 A2 | 8/2002 |
| WO | WO 00/37977 A1 | 6/2000 |
| WO | WO 01/38911 A1 | 5/2001 |

* cited by examiner

Primary Examiner—Akm Enayet Ullah
Assistant Examiner—Kevin S. Wood
(74) Attorney, Agent, or Firm—Gardner Groff, P.C.

(57) ABSTRACT

A super-large-effective-area (SLA) optical fiber that is suitable for communicating over a wide wavelength range and that, because of its large effective area, suppresses nonlinear effects that typically result from interaction between signal channels. The effective area, $A_{eff}$, of the SLA fiber of the present invention preferably is equal to or greater than approximately 80 $\mu m^2$ at a wavelength window around 1310 nm. The cutoff wavelength of the SLA fiber of the present invention preferably is less than 1310 nm. Thus, the SLA fiber of the present invention has a very large effective area and a very low cutoff wavelength. In accordance with the present invention, a variety of SLA fibers are provided that all have very large effective areas and desirable transmission properties. The large effective areas of the SLA fibers of the present invention enable nonlinear effects to be suppressed, as well as Stimulated Brillouin Scattering in analog transmission. The large effective areas also enable attenuation to be reduced. The result of suppressing nonlinear effects and reducing attenuation enable signals to be transmitted over long distances and over a broad bandwidth.

48 Claims, 4 Drawing Sheets

SUPER-LARGE-EFFECTIVE-AREA (SLA) OPTICAL FIBER AND COMMUNICATION SYSTEM INCORPORATING THE SAME

BACKGROUND OF THE INVENTION

1. Field of the Invention

The invention relates to optical fibers. More particularly, the invention relates to a super-large-effective-area optical fiber that exhibits low loss and that has a broad operation wavelength range.

2. Description of the Related Art

Optical fibers are thin strands of glass or plastic capable of transmitting optical signals, containing relatively large amounts of information, over long distances and with relatively low attenuation. Typically, optical fibers are made by heating and drawing a portion of an optical preform comprising a refractive core region surrounded by a protective cladding region made of glass or other suitable material. Optical fibers drawn from the preform typically are protected further by one or more coatings applied to the cladding region.

Advances in transmission over optical fibers have enabled optical fibers to have enormous bandwidth capabilities. Such bandwidth enables thousands of telephone conversations and hundreds of television channels to be transmitted simultaneously over a hair-thin fiber. Transmission capacity over an optical fiber is increased in wavelength division multiplexing (WDM) systems wherein several channels are multiplexed onto a single fiber, with each channel operating at a different wavelength. However, in WDM systems, nonlinear interactions between channels occur, such as 4-photon mixing, which severely reduces system capacity. This problem has been largely solved by U.S. Pat. No. 5,327,516 (the '516 patent). The '516 patent discloses an optical fiber that reduces these nonlinear interactions by introducing a small amount of chromatic dispersion at the operating wavelengths.

As the number of WDM channels to be transmitted over a single fiber increases, the optical power carried by the optical fiber also increases. As the optical power increases, the nonlinear effects caused by interaction between the channels also increases. Therefore, it is desirable for an optical fiber to provide a small amount of chromatic dispersion to each of the WDM channels in order to reduce the nonlinear interactions between the channels, especially in view of ever-increasing bandwidth demands. However, in order to be able to restore the signal after the transmission link, it is important that the dispersion introduced vary as little as possible amongst the different WDM channels.

Important advances have been made in the quality of the material used in making optical fibers. In 1970, an acceptable loss for glass fiber was in the range of 20 decibels per kilometer (dB/km), whereas today losses are generally about 0.25 dB/km. The theoretical minimum loss for glass fiber is less than 0.15 dB/km, and it occurs at a wavelength of about 1550 nanometers (nm). Dispersion in a glass fiber causes pulse spreading for pulses that include a range of wavelengths, due to the fact that the speed of light in a glass fiber is a function of the transmission wavelength of the light. Pulse broadening is a function of the fiber dispersion, the fiber length and the spectral width of the light source. Dispersion for individual fibers is generally illustrated using a graph (not shown) having dispersion on the vertical axis (in units of picoseconds (ps) per nanometer (nm), or ps/nm) or ps/nm-km (kilometer) and wavelength on the horizontal axis. There can be both positive and negative dispersion, so the vertical axis may range from, for example, −250 to +25 ps/nm km. The wavelength on the horizontal axis at which the dispersion equals zero corresponds to the highest bandwidth for the fiber. However, this wavelength typically does not coincide with the wavelength at which the fiber transmits light with minimum attenuation.

For example, typical first generation single mode fibers generally transmit with minimum attenuation at 1550 nm, whereas dispersion for the same fiber would be approximately zero at 1310 nm. Also, the aforementioned theoretical minimum loss for glass fiber occurs at the transmission wavelength of about 1550 nm. Because Erbium-doped amplifiers, which currently are the most commonly used optical amplifiers for amplifying optical signals carried on a fiber, operate in 1530 to 1565 nm range, the transmission wavelength normally used is 1550 nm. Because dispersion for such a fiber normally will be closest to zero at a wavelength of 1310 nm rather than at the optimum transmission wavelength of 1550 nm, attempts are constantly being made to improve dispersion compensation over the transmission path in order to provide best overall system performance (i.e., low optical loss and low dispersion).

It is desirable to suppress the aforementioned nonlinear optical effects and to reduce attenuation over a broad bandwidth in order to improve the spectral efficiency and reduce the bit-error-rate of wavelength division multiplexing and dense wavelength division multiplexing (WDM/DWDM) optical transmission systems. Super-large effective area (SLA) fibers have been developed to meet these needs. SLA fibers are normally used as transmission fibers and normally have both a positive dispersion and a positive dispersion slope. The large effective areas of these fibers suppress nonlinear effects so that transmission is improved over a broad wavelength range. However, most SLA fibers currently being produced have a cutoff wavelength at approximately 1450 nm, which presents two disadvantages. First, this cutoff wavelength makes single mode operation within the ~1300 nm wavelength window impossible, which is the wavelength window in which dispersion is minimized for single mode fibers. SONET/SDH transmission at 1310 nm remains popular in metro networks. In addition, longer distance (e.g., greater than 20 km) cable television transmission at 1550 nm could benefit by reducing the threshold for Stimulated Brillouin Scattering (SBS) in SLA fiber. However, the higher cutoff wavelength of current SLA fibers would preclude use of 1310 nm services on the same fiber route, making it less flexible and therefore less likely to be deployed. Finally, a cutoff wavelength of 1450 nm is not optimum for Raman pumping of signals in the S and C bands.

It would be desirable to provide an SLA optical fiber having a lower cutoff wavelength than existing SLA fibers and which has the same or improved transmission properties when compared with those associated with existing SLA fibers, including, for example, reduced nonlinear optical effects and low attenuation over a broad range of wavelengths.

SUMMARY OF THE INVENTION

The present invention provides a super-large-effective-area (SLA) optical fiber that is suitable for operating over a wide wavelength range and that, because of its large effective area, suppresses nonlinear effects of all types. The effective area, $A_{eff}$, of the SLA fiber of the present invention preferably is equal to or greater than approximately 80 $\mu m^2$ at a wavelength window around 1310 nm. Thus, the SLA fiber of the present invention has a very large effective area and a low cutoff wavelength better suited for 1310 nm operation. In accordance with the present invention, a variety of SLA fibers are provided that all have very large effective areas and desirable transmission properties. The large effective areas of the SLA fibers of the present invention enable nonlinear effects to be suppressed. Although the effective areas of the SLA fibers are quite large, the SLA fibers provide strong guidance of the optical energy and very good resistance to microbending and macrobending loss effects. The result of suppressing nonlinear effects enables signals to be transmitted over long distances and over a broad bandwidth. Cable TV systems will also benefit by reducing the threshold for Stimulated Brillouin Scattering (SBS), which is the most prevalent nonlinear effect in analog lightwave systems. The SBS threshold limits the launch power in amplified CATV transmission at 1550 nm, limiting the distance between amplifiers, negatively affecting system costs.

The SLA fiber preferably comprises a core region that is segmented into at least first and second portions that have positive relative refractive indices $n_{1a}$ and $n_{1b}$, respectively, a first annular region (i.e., a trench region) surrounding the core region that has a negative relative refractive index $n_2$, and a cladding region surrounding the first annular region that has a relative refractive index $n_0$ of 0.0%. The term "segmented", as that term is used herein, is intended to indicate that the core has at least two regions that have different relative indexes of refraction.

The phrase "relative refractive index", as that phrase is used herein, means that the values of the refractive indices of the regions of the fiber other than the cladding region are given as values that are relative to the refractive index of the cladding region. This is why the cladding region is said to have a relative refractive index of 0.0%. The core region is segmented such that the relative refractive index of the core region is at a maximum where the edge of the first portion of the core region coincides with the edge of the second portion of the core region. The location in the core region that corresponds to the maximum relative refractive index preferably is offset radially from the center of the core region. Segmenting the core region in this manner (i.e., such that the maximum relative refractive index occurs at a location in the core that is radially offset from the center of the core) enables the fiber to have a super-large effective area and, at the same time, a very low cutoff wavelength. Furthermore, these transmission properties are obtained without causing any increase in macrobend loss or attenuation.

In accordance with an alternative embodiment, the SLA fiber of the present invention comprises a core that is not segmented. However, the trench region may be divided into first and second trench portions, which have different relative indices of refraction.

These and other features and advantages of the present invention will become apparent from the following description, drawings and claims.

DETAILED DESCRIPTION OF THE PREFERRED EMBODIMENT

Figure 1:
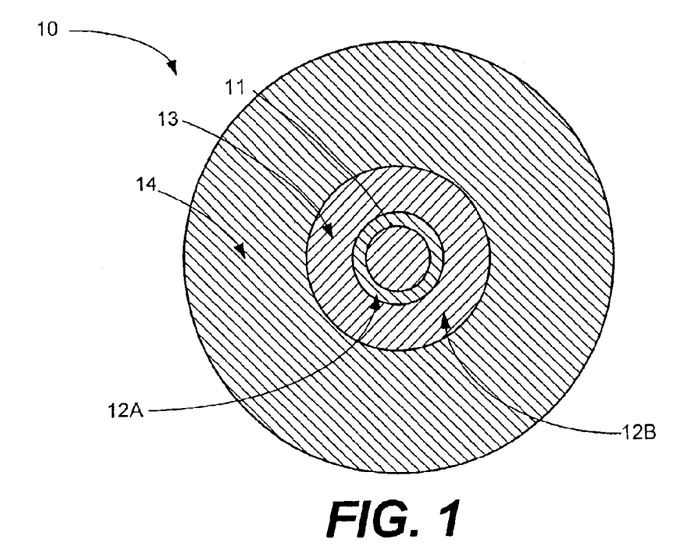
FIG. 1 illustrates a cross-sectional end view of a super-large effective area (SLA) optical fiber in accordance with an example embodiment of the present invention.

FIG. 1 is a cross-sectional end view of a super-large effective area (SLA) optical fiber 10 in accordance with an example embodiment of the present invention. The SLA fiber 10 includes a segmented central core region 11, a first annular region 13 that surrounds the core region 11 and an outer cladding 14 that surrounds the trench region. The core region 11 is segmented into first and second core-region portions, 12A and 12B, which have relative refractive index values $n_{1a}$ and $n_{1b}$, respectively, which are different from each other. The first annular region, or trench region) 13 has a nominal refractive index $n_2$. The outer cladding 14 has a nominal refractive index $n_3$. As discussed below in detail with reference to FIG. 7, an SLA fiber in accordance with the present invention may have additional regions, such as another negative refractive index region in addition to the trench region 13.

It should be noted that the optical fiber 10 shown in FIG. 1 is not drawn to scale (the outer diameter of cladding layer 14 preferably is approximately 125 µm, while the diameter of the core region 11 preferably is approximately 7–10 µm). The present invention is not limited to any particular dimensions for the sizes of the regions of the fiber 10. Also, as discussed in greater detail below, because of the relative refractive index values of the various regions, and due to their functions, the first annular region 13 will be referred to hereinafter as the "trench" region and the region 14 will be referred to hereinafter as the outer cladding.

It should also be noted that although the circular rings shown in FIG. 1 suggest that the changes between the refractive indices of the regions 11–14 are abrupt, this may be, but is not necessarily, the case. The circular rings enable distinctions between the regions to be easily made, which aids in describing the present invention.

Various refractive index profiles that provide various SLAs in accordance with the present invention will now be discussed with reference to FIGS. 2–7. The SLAs associated with each of these profiles have large effective areas and desirable transmission properties, as set forth below in detail. It should be noted that these refractive index profiles and the associated SLAs are only examples and that the present invention is not limited to these examples. The examples are provided for the purpose of demonstrating that a SLA fiber having a core that is segmented into two or more portions that have different refractive indices can have a super-large effective area and desirable transmission properties, such as a low cutoff wavelength, low macrobending loss, low microbending loss and low attenuation. Of course, the transmission properties vary depending on the profile, and the profile is selected in accordance with the desired transmission properties. For example, one profile may provide a larger effective area and lower cutoff wavelength than another profile, but may have increased macrobending loss and/or attenuation than the other profile, and vice versa.

Figure 2:
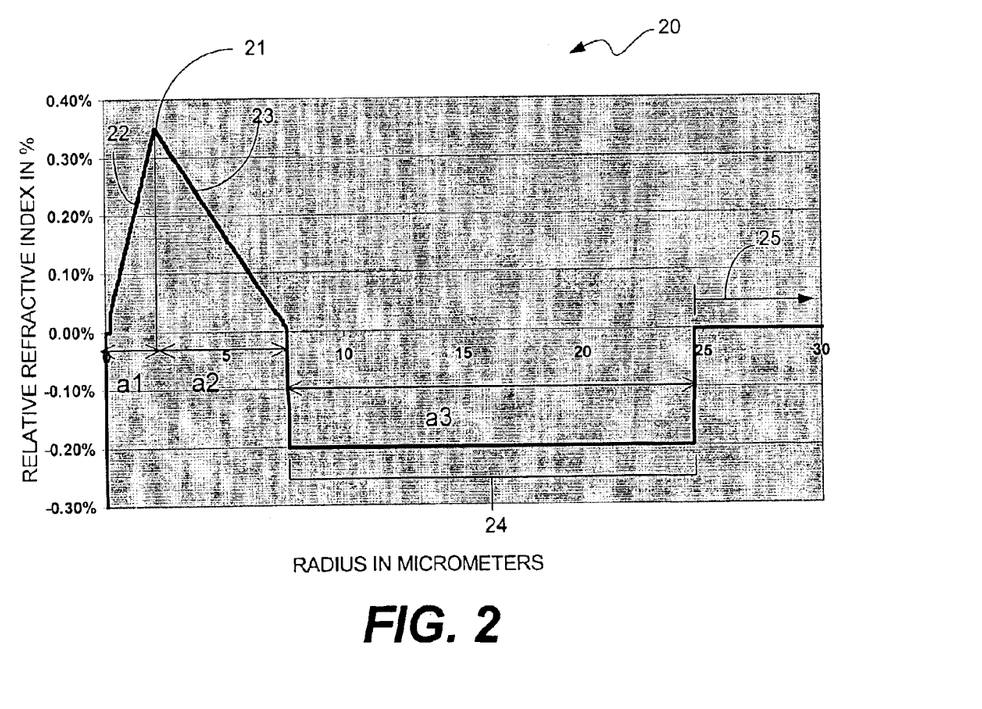
FIGS. 2–8 illustrate various relative refractive index profiles of SLA fibers of the present invention in accordance with various example embodiments.

FIG. 2 is a graphical representation of the refractive index profile 20 of an SLA fiber in accordance with an example embodiment of the present invention, such as that shown in FIG. 1, for example. The Y-axis corresponds to relative refractive index as a percentage (i.e., divided by 100) and the X-axis corresponds to positions along a radius in micrometers from the center of the core 11 of the fiber 10 extending outwardly towards the outer edge of the cladding 14 of the fiber 10. The refractive index values shown in FIG. 2 are relative refractive index values, i.e., they are relative to the refractive index of the outer cladding 14. Therefore, the index values given in FIG. 2 should be regarded as the difference between the index value for the particular region and that of the outer cladding 14 divided by that of the outer cladding. In other words, the refractive index value for a given region is given by the equation $(n_{region} - n_{cladding})/n_{cladding}$, where $n_{region}$ corresponds to the refractive index of the particular region and $n_{cladding}$ corresponds to the refractive index of the cladding. Therefore, when the indices of refraction of the various regions of the fiber 10 are discussed herein, it should be understood that they are actually being discussed in terms of relative indices of refraction.

The SLA fiber 10 comprises a germanium-doped silica ($SiO_2$) core 11 (e.g., $SiO_2$ doped with an appropriate amount of $GeO_2$), a fluorine (F) and/or germanium (Ge)-doped trench region 13 surrounding the core region 11 (e.g., $SiO_2$ doped with an appropriate amount of $GeO_2$ and F), and a pure silica outer cladding 14 surrounding the trench region 13. The portions 12A and 12B of the core region 11 preferably are doped with different amounts of germanium to provide those regions with different, positive refractive index values $n_{1a}$ and $n_{1b}$, respectively, with respect to location in the X-direction. The doping of the trench region 13 provides the trench region 13 with a negative relative refractive index. The portions of the refractive index profile shown in FIG. 2 that correspond to the core regions 12A and 12B are governed by the following equations:

$$n_{1a}(0 \le r \le a_1) = \left(\frac{r}{a_1}\right)^{\alpha_1} \times n_{max}$$

$$n_{1b}(a_1 \le r \le (a_1 + a_2)) = \left[1 - \left(\frac{r - a_1}{a_2}\right)^{\alpha_2}\right] \times n_{max}$$

where r is the radius position in micrometers, where $n_{max}$ is the maximum relative refractive index of the core region 11, where $a_1$ is the radius of the first portion of the core region, where $a_2$ is the thickness of the second portion of the core region, where $n_{1a}$ is the relative refractive index of the first portion of the segmented core region, where $n_{1b}$ is the relative refractive index of the second portion of the segmented core region, where $a_1+a_2$ is the radius r of the core region, where $a_3$ is the width of the trench region, and where $a_1+a_2+a_3$ is the radius out to the outer edge of the trench region 13 adjacent the beginning of the outer cladding 14.

The radius of the trench region is given by: $a_1+a_2 \le r \le a_1+a_2+a_3$. It should be noted that although the outer cladding 14 is only shown as having a radius of 30 μm in FIG. 2, this is simply due to the drawing page constraints. The radius of the outer cladding 14 will typically be much larger than what is shown (e.g., 62.5 μm), although the present invention is not limited to any particular radial dimension of the cladding. In fact, larger cladding dimensions may be desirable.

The term $a_1 \ge 1$ is an exponential that dictates the shape of core region 11. Preferably, $0 \le a_1 \le 2.65$, $7.1 \le a_1+a_2 \le 10$, and $3 \le a_3 \le 25$, where all values are in units of micrometers. Preferably, $0.25\% \le n_{max} \le 0.42\%$. Preferably, $-0.4\% \le n_2 \le -0.075\%$, where $n_2$ is the relative refractive index of the trench region 13. The refractive index of the cladding region will be referred to herein as $n_0$, wherein $n_0$ is 0.0%. The relative refractive index profile 20 shown in FIG. 2 reflects these values and ranges. The maximum relative refractive index of the segmented core region corresponds to point 21 of the profile 20. The fact that the maximum 21 is not located on the Y-axis indicates that the maximum 21 is offset from the center of the core region 11. The lines 22 and 23 of increasing and decreasing slope, respectively, give the profile of the core region 11 a somewhat triangular shape. Although the core region 11 is segmented, it is not necessary that the parts of the profile 20 corresponding to portions 12A and 12B of the core region 11 be linear. This portion of the profile corresponding to the core 11 could be, for example, parabolic, elliptical, etc. Also, the part of the profile corresponding to one portion of the segmented core region could be, for example, linear and the part of the profile corresponding to the other portion of the core region could be, for example, nonlinear.

The portion of the profile 20 that corresponds to the trench region 13 is represented by numeral 24 in FIG. 2. The portion of the profile 20 that corresponds to the outer cladding 14 is indicated by numeral 25 in FIG. 2. The transmission properties for the profile 20, shown in FIG. 2 are:

1) Effective area $A_{eff}$ (1550 nm)$\ge 95$ um$^2$; $A_{eff}$ (1310 nm)$\ge 80$ um$^2$;
2) cable cutoff wavelength$\le 1310$ nm;
3) Macrobending loss: smaller than 10 dB/m with 20 mm diameter mandrel;
4) Attenuation loss: smaller than 0.19 dB/km at 1550; smaller than 0.35 dB/km at 1310 nm; and
5) Dispersion (D): D~20 ps/km.nm at 1550 nm;
6) Ratio of dispersion versus dispersion slope (RDS): RDS~0.0031 nm$^{-1}$ at 1550 nm.

Figure 3:
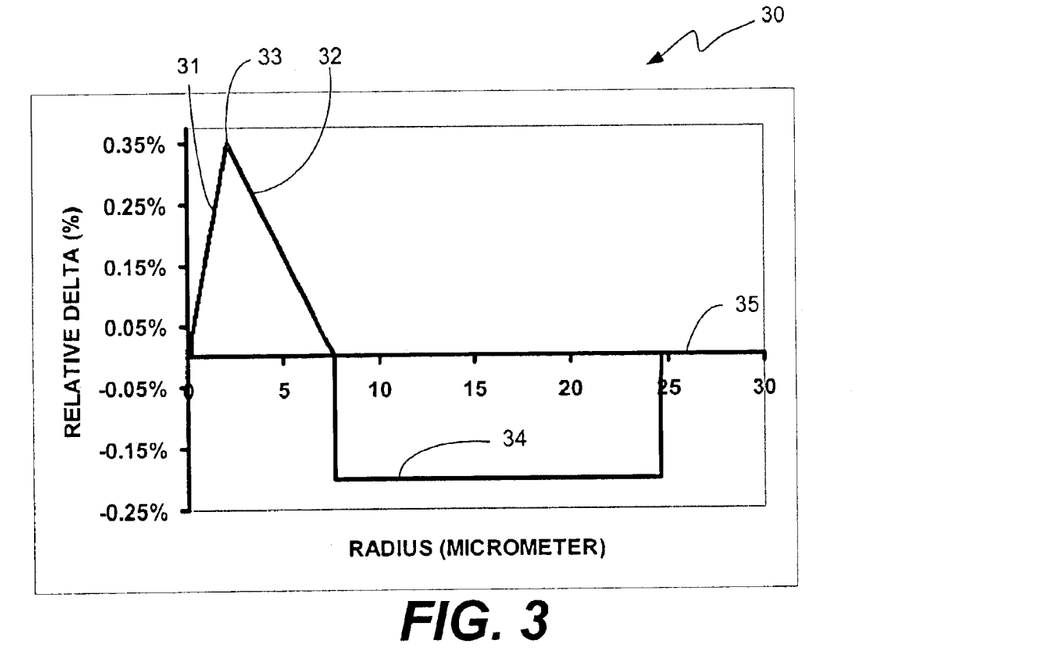

FIG. 3 is a relative refractive index profile 30 of an SLA fiber of the present invention in accordance with another example embodiment. The transmission properties for this SLA fiber are:

1) Effective area $A_{eff}$ (1550 nm)$\cong 113.9$ μm$^2$; $A_{eff}$ (1310 nm)$\cong 100.3$ um$^2$;
2) cable cutoff wavelength$\le 1300$ nm;
3) Macrobending loss: smaller than 10 dB/m with 20 mm diameter mandrel;
4) D(1550 nm): 20.55 ps/km/nm
5) Dispersion slope (S)(1550 nm): 0.064 ps/km/nm$^2$
6) Attenuation loss: smaller than 0.19 dB/km at 1550; smaller than 0.35 dB/km at 1310 nm;

The first portion of the segmented core of the SLA fiber corresponds to line 31. The second portion of the segmented core of the SLA fiber corresponds to line 32. The maximum relative refractive index corresponds to point 33. It can be seen from the location of the refractive index maximum 33 that the maximum 33 is offset radially from the center of the core region, which is preferable. Also, the maximum 33 of the profile 30 of FIG. 3 is slightly greater than the maximum 21 of the profile 20 shown in FIG. 1. The trench region of the SLA fiber corresponds to the part of the profile 30 identified by numeral 34. The part of the profile 30 that corresponds to the outer cladding of the SLA fiber is identified by numeral 35.

It can be seen from the profile 30 and the transmission properties listed above that the SLA fiber of the present invention in accordance with this example also has a very low cutoff wavelength even and, at the same time, a very large effective area. Furthermore, the fiber represented by profile 30 has a very low macrobend loss and a low attenuation loss.

Figure 4:
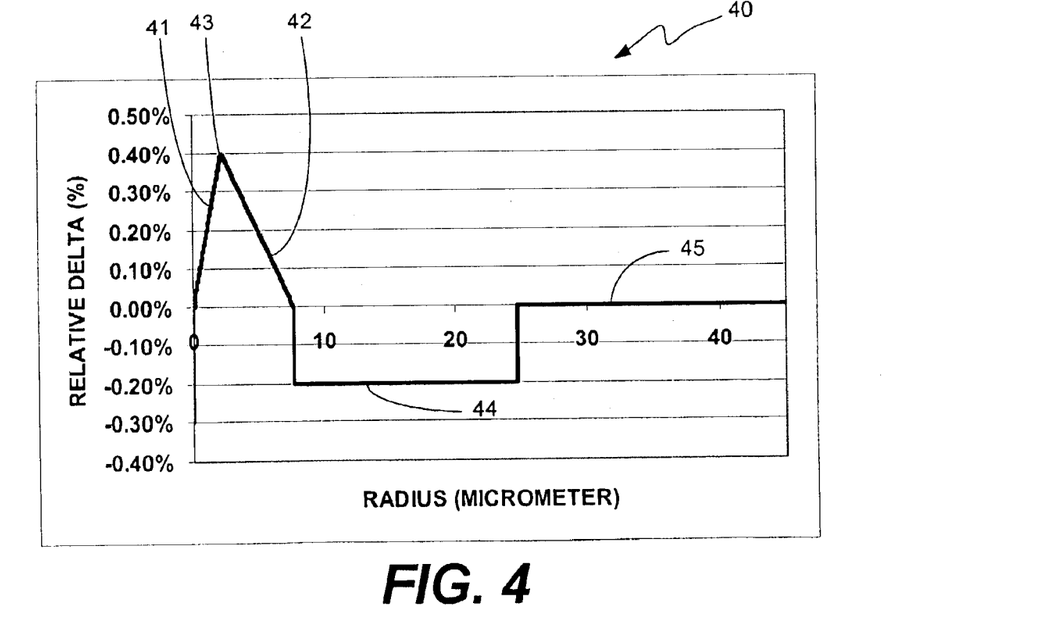

FIG. 4 is a relative refractive index profile 40 of an SLA fiber of the present invention in accordance with another example embodiment. The transmission properties for this SLA fiber are:

1) Effective area $A_{eff}$ (1550 nm)$\cong 107.3$ μm$^2$; $A_{eff}$ (1310 nm)$\cong 93.7$ um$^2$;

2) cable cutoff wavelength ≦ 1300;
3) Macrobending loss: smaller than 10 dB/m with 20 mm diameter mandrel;
4) D(1550 nm): 20.49 ps/km/nm
5) S(1550 nm): 0.064 ps/km/nm$^2$;
6) Attenuation loss: smaller than 0.19 dB/km at 1550; smaller than 0.35 dB/km at 1310 nm;

The first portion of the segmented core of the SLA fiber corresponds to line 41. The second portion of the segmented core of the SLA fiber corresponds to line 42. The maximum relative refractive index corresponds to point 43. It can be seen from the location of the refractive index maximum 43 that the maximum is offset radially from the center of the core region. The profile 40 of FIG. 4 is very similar to the profile 30 of FIG. 3 except that the maximum 43 of the profile 40 is significantly greater than the maximum 33 of the profile 30. Likewise, the maximum 43 of the profile 40 shown in FIG. 4 is significantly greater than the maximum 21 of the profile 20 shown in FIG. 2.

The trench region of the profile 40 is identified by numeral 44. The part of the profile 40 that corresponds to the outer cladding of the SLA fiber is identified by numeral 45. It can be seen from the profile 40 and the transmission properties listed above that the SLA fiber of the present invention in accordance with this example also has a very low cutoff wavelength even and, at the same time, a very large effective area. Furthermore, the fiber represented by profile 40 has a very low macrobend loss and a low attenuation loss.

Figure 5:
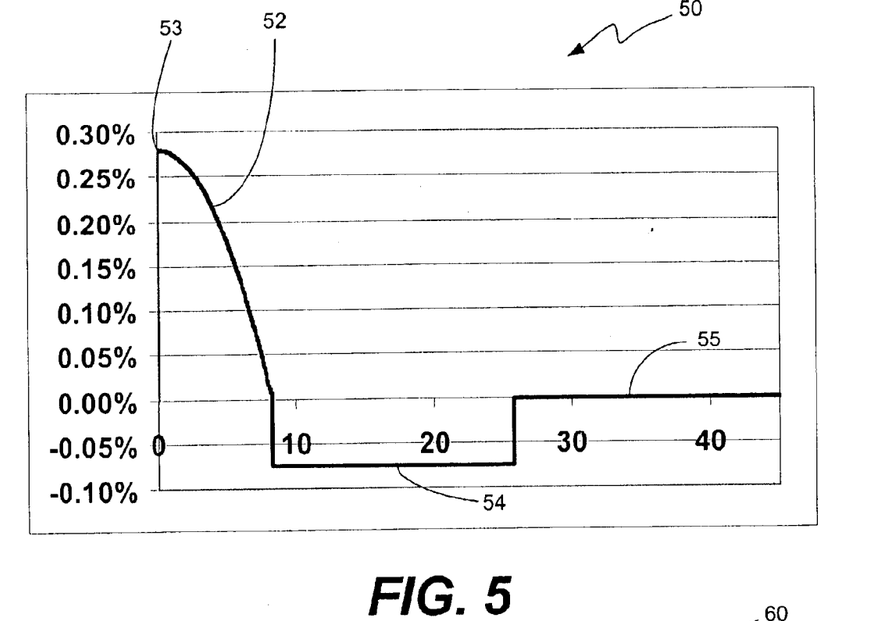

FIG. 5 is a relative refractive index profile 50 of an SLA fiber of the present invention in accordance with another example embodiment. The transmission properties for this SLA fiber are:

1) Effective area $A_{eff}$ (1550 nm)≅122.9 $\mu m^2$; $A_{eff}$ (1310 nm)≅102.1 um$^2$;
2) cable cutoff wavelength ≦ 1320 nm;
3) Macrobending loss: smaller than 10 dB/m with 20 mm diameter mandrel;
4) D(1550 nm): 19.60 ps/km/nm
5) S(1550 nm): 0.063 ps/km/nm$^2$
6) Attenuation loss: smaller than 0.19 dB/km at 1550; smaller than 0.35 dB/km at 1310 nm;

The maximum refractive index 53 is on the Y-axis, which means that the point in the core at which the maximum occurs generally is not offset from the center of the core. As with the other examples, the core is segmented into two portions that have different relative refractive indices. The parabolic shape of the portion 52 of the profile 50 means that the exponential, α, which defines the shape of the profile of the core, is greater than 2. The trench region portion of the profile 54 is relatively shallow in comparison to the trench region portions of the profiles shown in FIGS. 2–4. The portion of the profile corresponding to the cladding region is represented by numeral 55.

Figure 6:
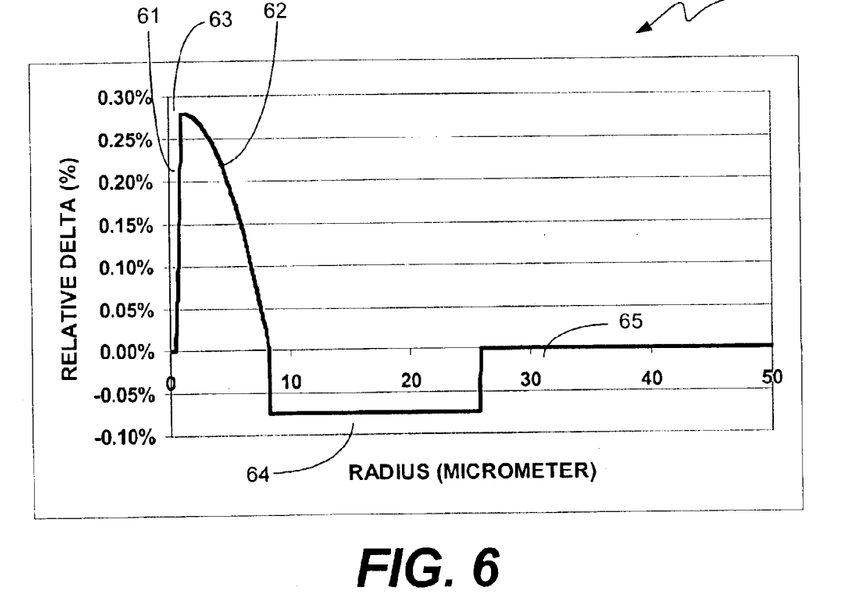

FIG. 6 is a relative refractive index profile 60 of an SLA fiber of the present invention in accordance with another example embodiment. The transmission properties for this SLA fiber are:

1) Effective area $A_{eff}$ (1550 nm)≅131.2 $\mu m^2$; $A_{eff}$ (1310 nm)≅112.4 um$^2$;
2) cable cutoff wavelength ≦ 1340 nm;
3) Macrobending loss: smaller than 10 dB/m with 20 mm diameter mandrel;
4) D(1550 nm): 20.08 ps/km/nm
5) S(1550 nm): 0.064 ps/km/nm$^2$
6) Attenuation loss: smaller than 0.19 dB/km at 1550; smaller than 0.35 dB/km at 1310 nm.

The profile 60 is very similar to the profile 50 of FIG. 5, with the exception that the maximum relative refractive index point 63 is offset from the center axis of the core, as indicated by line 61. The trench region of the SLA fiber corresponds to the part of the profile 60 identified by numeral 64. As is the case with the profile 50 of FIG. 5, the relative refractive index of the trench region is greater than that of the trench regions corresponding to the profiles of FIGS. 2–4. The part of the profile 60 that corresponds to the outer cladding of the SLA fiber is identified by numeral 65.

Figure 7:
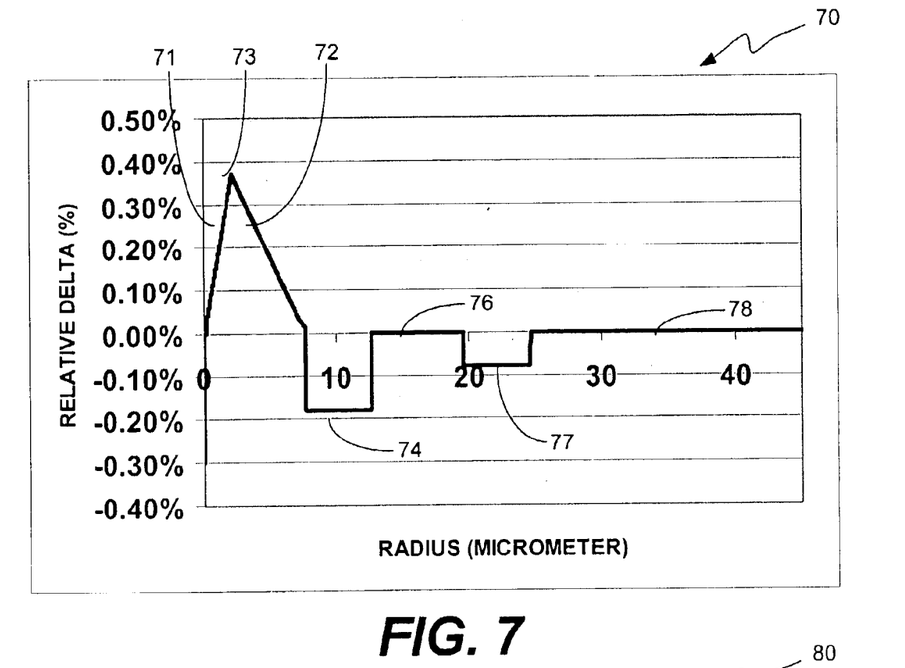

FIG. 7 is a relative refractive index profile 70 of an SLA fiber of the present invention in accordance with another example embodiment. The transmission properties for this SLA fiber are:

1) Effective area $A_{eff}$ (1550 nm)≅106.4 $\mu m^2$; $A_{eff}$ (1310 nm)≅92.5 um$^2$;
2) cable cutoff wavelength ≦ 1300 nm;
3) Macrobending loss: smaller than 10 dB/m with 20 mm diameter mandrel;
4) D(1550 nm): 20.64 ps/km/nm
5) S(1550 nm): 0.063 ps/km/nm$^2$
6) Attenuation loss: smaller than 0.19 dB/km at 1550; smaller than 0.35 dB/km at 1310 nm;

The first portion of the segmented core of the SLA fiber corresponds to line 71. The second portion of the segmented core of the SLA fiber corresponds to line 72. The maximum relative refractive index corresponds to point 73. It can be seen from the location of the refractive index maximum 73 that the maximum is offset radially from the center of the core region. The trench region of the SLA fiber corresponds to the part of the profile identified by numeral 74. By comparing this profile 70 to the example profiles of FIGS. 2–6, it can be seen that the portion of the profile 74 corresponding to the trench region is relatively deep (i.e., lower relative refractive index than in the examples of FIGS. 2–6), but also relatively narrow. Following the trench region, the relative refractive index goes to 0.0% over the portion of the profile represented by numeral 76, and then goes negative over the portion of the profile represented by numeral 77. Therefore, as opposed to the profiles shown in FIGS. 2–6, the profile 70 shown in FIG. 7 has two depressed regions, namely, a trench region represented by profile portion 74 and a second region represented by profile portion 77 that has a negative relative refractive index that is greater than the relative refractive index of the trench region. The portion of the profile represented by numeral 78 corresponds to the cladding region.

It can be seen from the transmission properties listed above for the SLA having the profile 70 that the SLA fiber of the present invention in accordance with this example also has an extremely low cutoff wavelength and, at the same time, a very large effective area.

Figure 8:
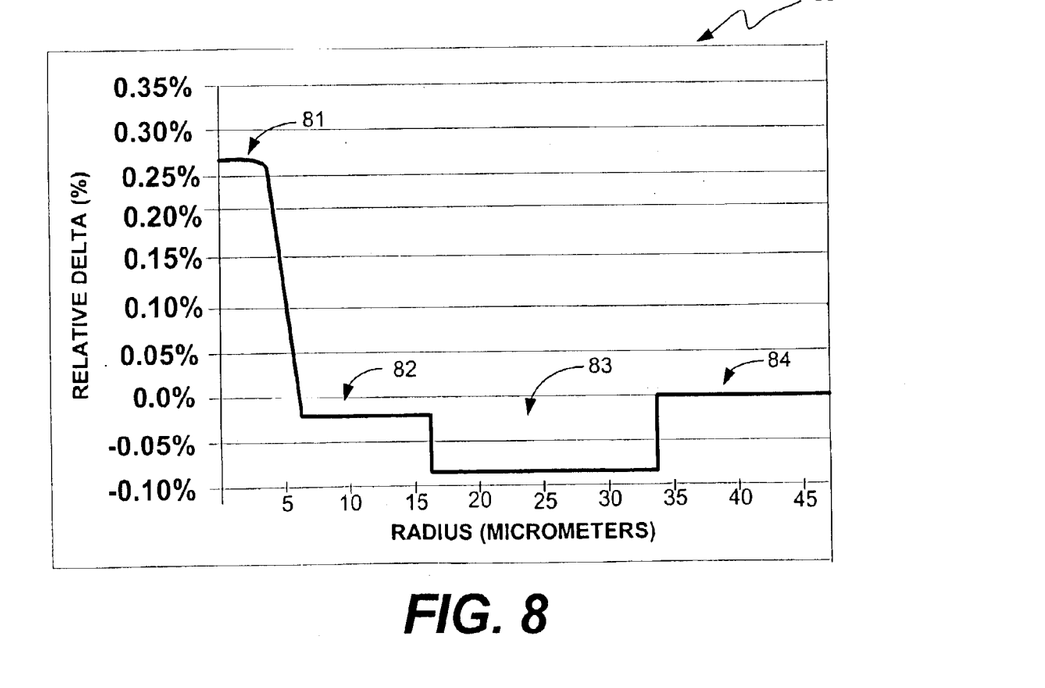

FIG. 8 is a relative refractive index profile 80 of an SLA fiber of the present invention in accordance with another example embodiment. As with the fibers of the embodiments described above, the transmission properties for this SLA fiber are also desirable. For example, the fiber has an effective area $A_{eff}$ (1550 nm)≅110 $\mu m^2$, a cable cutoff wavelength ≦ 1270 nm, and a macrobending loss smaller than 0.810 dB/m with 32 mm diameter mandrel. The dispersion is D(1550 nm): 18.57 ps/km/nm. The dispersion slope is S(1550 nm): 0.061 ps/km/nm The relative dispersion slope (RDS) of the SLA fiber in accordance with this example embodiment is 0.0033 nm$^{-1}$.

The core of the SLA fiber in accordance with this example embodiment is not segmented, and has a substantially constant relative index of refraction. The portion of the profile 80 that corresponds to the core is represented by reference numeral line 81. The maximum relative refractive index is approximately 0.25%. The trench region of the SLA fiber has first and second portions, which are identified by reference numerals 82 and 83, respectively. The first portion 82 of the trench region extends from approximately 6 microns to approximately 18 microns. The second portion of the trench region, 83, extends from approximately 18 microns to approximately 33 microns. The 33-micron thickness of the trench region 83 is only an example, and it may range from approximately 30 microns to approximately 45 microns. In this example, the portion of the profile that corresponds to the cladding region extends from approximately 33 microns to approximately 62.5 microns.

It can be seen from the transmission properties listed above for the SLA having the profile 80 that the SLA fiber of the present invention in accordance with this example also has an extremely low cutoff wavelength and, at the same time, a very large effective area and low optical loss characteristics.

It can be seen from the examples provided above that the SLA of the present invention has a super-large effective area and desirable transmission properties, such as relatively low cutoff wavelength, for example. Furthermore, the SLA in accordance with the present invention has other desirable transmission properties that are comparable to or better than those of currently available SLA fibers, such as low macrobending loss, low microbending loss and low attenuation, for example.

It will be apparent to those skilled in the art that many changes and substitutions can be made to the embodiments of the optical fibers described herein without departing from the scope of the present invention. Such changes and substitutions include, but are not limited to, the use of different doping materials to achieve the same or different profile shapes, and the use of plastic materials (rather than glass) in making the optical fiber. Also, as stated above, the present invention is not limited to the profiles and transmission properties discussed above with reference to FIGS. 2–8. Those skilled in the art will understand, in view of the present disclosure, that concepts and principles of the present invention can be used to obtain other profiles and other associated transmission properties than those described above to provide an SLA fiber in accordance with the present invention.

What is claimed is:

1. An optical fiber communications system, comprising:
   at least one source of optical energy;
   an optical fiber cable comprising an optical fiber having a positive dispersion and a positive dispersion slope, the optical fiber cable being coupled to said at least one source of energy, the optical fiber having a core region and a cladding region surrounding the core region, the fiber having an effective area, $A_{eff}$, that is equal to or greater than approximately 80 micrometers squared ($\mu m^2$) at a wavelength of approximately 1310 nm and having a cable cutoff wavelength less than or equal to approximately 1310 nm, wherein the core region is segmented into at least first and second refractive index portions, the first and second refractive index portions having first and second relative indexes of refraction $n_{1a}$ and $n_{1b}$, respectively, that are different from each other, and wherein the first and second relative indexes of refraction are positive.

2. The optical fiber communications system of claim 1, wherein the optical fiber has an effective area, $A_{eff}$, that is equal to or greater than approximately 95 $\mu m^2$ at a wavelength of approximately 1550 nm.

3. The optical fiber communications system of claim 1, wherein the optical fiber further includes:
   a trench region between the core region and the cladding region, the trench region having a negative relative index of refraction $n_2$.

4. The optical fiber communications system of claim 3, wherein the core region having the first and second refractive index portions has a relative refractive index profile defined by the equations:

$$n_{1a}(0 \leq r \leq a_1) = \left(\frac{r}{a_1}\right)^{\alpha_1} \times n_{max}$$

$$n_{1b}(a_1 \leq r \leq (a_1 + a_2)) = \left[1 - \left(\frac{r - a_1}{a_2}\right)^{\alpha_2}\right] \times n_{max}$$

where r is a radius position in micrometers, where $n_{max}$ is the maximum relative refractive index of the core region, where $a_1$ is a radius of the first portion of the core region, where $a_2$ is a thickness of the second portion of the core region, where $n_{1a}$ is a relative refractive index of the first portion of the segmented core region, where $n_{1b}$ is a relative refractive index of the second portion of the segmented core region, where $a_1+a_2$ is a radius r of the core region, where $a_3$ is a width of the trench region, and where $a_1+a_2+a_3$ is a radius out to an outer edge of the trench region adjacent a beginning of the cladding region.

5. The optical fiber communications system of claim 4, wherein $a_1 \geq 1$ is an exponent that dictates the shape of the refractive index profile of the core region.

6. The optical fiber communications system of claim 4, wherein approximately $0 \leq a_1 \leq 2.65$, approximately $7.1 \leq a_1+a_2 \leq 10$, and approximately $3 \leq a_3 \leq 25$, where $a_1$, $a_2$ and $a_3$ are in units of micrometers.

7. The optical fiber communications system of claim 4, wherein approximately $0.25\% \leq n_{max} \leq 0.42\%$.

8. The optical fiber communications system of claim 4, wherein approximately $-0.4\% \leq n_2 \leq -0.075\%$.

9. The optical fiber communications system of claim 1, wherein the optical fiber has a macrobending loss that is less than or equal to approximately 10 decibels per meter (dB/m).

10. The optical fiber communications system of claim 1, wherein the optical fiber has an attenuation loss that is less than or equal to approximately 0.19 decibels per kilometer (dB/km) at a wavelength of approximately 1550 nm and that is less than or equal to approximately 0.35 dB/km at a wavelength of approximately 1310 nm.

11. The optical fiber communications system of claim 1, wherein the optical fiber has a dispersion of approximately 20 picoseconds per kilometer.nanometer (ps/km.nm).

12. The optical fiber communications system of claim 1, wherein the optical fiber has a ratio of dispersion to dispersion slope (RDS) of approximately 0.0031 $nm^{-1}$.

13. A super-large effective area (SLA) optical fiber, the SLA fiber having a positive dispersion and a positive dispersion slope and having an effective area, $A_{eff}$, that is equal to or greater than approximately 80 $\mu m^2$ at a wavelength of approximately 1310 nm and having a cable cutoff wavelength less than or equal to approximately 1310 nm, the fiber having a core region and a cladding region surrounding the core region, wherein the core region is segmented into at least first and second refractive index portions, the first and second refractive index portions having first and second relative indexes of refraction $n_{1a}$ and $n_{1b}$, respectively, that are different from each other, and wherein the first and second relative indexes of refraction are positive.

14. The optical fiber of claim 13, wherein the optical fiber has an effective area, $A_{eff}$, that is equal to or greater than approximately 95 micrometers squared ($\mu m^2$) at a wavelength of approximately 1550 nm.

15. The optical fiber of claim 14, wherein the optical fiber further includes:
   a trench region between the core region and the cladding region, the trench region having a negative relative index of refraction $n_2$.

16. The optical fiber of claim 15, wherein the core region having the first and second refractive index portions has a relative refractive index profile defined by the equations:

$$n_{1a}(0 \le r \le a_1) = \left(\frac{r}{a_1}\right)^{\alpha_1} \times n_{max}$$

$$n_{1b}(a_1 \le r \le (a_1 + a_2)) = \left[1 - \left(\frac{r - a_1}{a_2}\right)^{\alpha_2}\right] \times n_{max}$$

where r is a radius position in micrometers, where $n_{max}$ is the maximum relative refractive index of the core region, where $a_1$ is a radius of the first portion of the core region, where $a_2$ is a thickness of the second portion of the core region, where $n_{1a}$ is a relative refractive index of the first portion of the segmented core region, where $n_{1b}$ is a relative refractive index of the second portion of the segmented core region, where $a_1+a_2$ is a radius r of the core region, where $a_3$ is a width of the trench region, and where $a_1+a_2+a_3$ is a radius out to an outer edge of the trench region adjacent a beginning of the cladding region.

17. The optical fiber of claim 16, wherein $a_1 \ge 1$ is an exponent that dictates the shape of the refractive index profile of the core region.

18. The optical fiber of claim 16, wherein approximately $0 \le a_1 \le 2.65$, approximately $7.1 \le a_1+a_2 \le 10$, and approximately $3 \le a_3 \le 25$, where $a_1$, $a_2$ and $a_3$ are in units of micrometers.

19. The optical fiber of claim 16, wherein approximately $0.25\% \le n_{max} \le 0.42\%$.

20. The optical fiber of claim 16, wherein approximately $-0.4\% \le n_2 \le -0.075\%$.

21. The optical fiber of claim 13, wherein the optical fiber has a macrobending loss that is less than or equal to approximately 10 decibels per meter (dB/m).

22. The optical fiber of claim 13, wherein the optical fiber has an attenuation loss that is less than or equal to approximately 0.19 decibels per kilometer (dB/km) at a wavelength of approximately 1550 nm and that is less than or equal to approximately 0.35 dB/km at a wavelength of approximately 1310 nm.

23. The optical fiber of claim 13, wherein the optical fiber has a dispersion of approximately 20 picoseconds per kilometer.nanometer (ps/km.nm).

24. The optical fiber of claim 13, wherein the optical fiber has a ratio of dispersion to dispersion slope (RDS) of approximately 0.0031 $nm^{-1}$.

25. A super-large effective area (SLA) optical fiber, the SLA fiber having a positive dispersion and a positive dispersion slope and having an effective area, $A_{eff}$, that is equal to or greater than approximately 90 $\mu m^2$ at a wavelength of approximately 1310 nm and having a cable cutoff wavelength less than or equal to approximately 1270 nm, the fiber having a core region and a cladding region surrounding the core region.

26. The optical fiber of claim 25, wherein the optical fiber has an effective area, $A_{eff}$, that is equal to or greater than approximately 95 micrometers squared ($\mu m^2$) at a wavelength of approximately 1550 nm.

27. The optical fiber of claim 26, wherein the optical fiber further includes:
   a trench region between the core region and the cladding region, the trench region having a negative relative index of refraction $n_2$.

28. The optical fiber of claim 27, wherein the trench region has a first trench portion and a second trench portion, the first and second trench portions having negative relative refractive indices which are different.

29. The optical fiber of claim 28, wherein the core region has a radius $a_1$ that extends from the center of the core region outwardly toward the cladding region approximately 6 micrometers, and wherein the first trench portion has a radius $a_2$ that extends outwardly from the center of the core region toward the cladding region of approximately 18 micrometers to approximately 24 micrometers, and wherein the second trench portion has a radius $a_3$ that extends outwardly from the center of the trench region toward the cladding region to approximately 30 micrometers to approximately 45 micrometers.

30. The optical fiber of claim 25, wherein the optical fiber has a macrobending loss at 20 millimeter diameter that is less than or equal to approximately 10 decibels per meter (dB/m).

31. The optical fiber of claim 25, wherein the optical fiber has a dispersion of approximately 18 to 20 picoseconds per kilometer.nanometer (ps/km.nm).

32. The optical fiber of claim 25, wherein the optical fiber has a dispersion slope of approximately 0.060 to approximately 0.065 picoseconds per nanometer squared.kilometer ($ps/nm^2/km$).

33. The optical fiber of claim 25, wherein the optical fiber has a ratio of dispersion to dispersion slope (RDS) of approximately 0.003 $nm^{-1} \pm -0.0005$ $nm^{-1}$.

34. The optical fiber of claim 25, wherein the core region has a maximum relative refractive index of between approximately 0.25% and approximately 0.32%.

35. The optical fiber of claim 25, wherein the first portion of the trench region has a relative refractive index of approximately $-0.08\%$ to approximately $-0.02\%$.

36. The optical fiber of claim 25, wherein the first portion of the trench region has a relative refractive index of approximately $-0.02\%$ to approximately $0.08\%$.

37. A super-large effective area (SLA) optical fiber, the SLA fiber having a positive dispersion and a positive dispersion slope and having an effective area, $A_{eff}$, that is equal to or greater than approximately 90 $\mu m^2$ at a wavelength of approximately 1310 nm and having a cable cutoff wavelength less than or equal to approximately 1270 nm, the fiber having a core region and a cladding region surrounding the core region, the SLA fiber having a relatively low attenuation at a wavelength of approximately 1380 nm.

38. The optical fiber of claim 37, wherein the optical fiber has an effective area, $A_{eff}$, that is equal to or greater than approximately 95 micrometers squared ($\mu m^2$) at a wavelength of approximately 1550 nm.

39. The optical fiber of claim 38, wherein the optical fiber further includes:
   a trench region between the core region and the cladding region, the trench region having a negative relative index of refraction $n_2$.

40. The optical fiber of claim 39, wherein the trench region has a first trench portion and a second trench portion, the first and second trench portions having negative relative refractive indices which are different.

41. The optical fiber of claim 40, wherein the core region has a radius $a_1$ that extends from the center of the core region outwardly toward the cladding region approximately 6 micrometers, and wherein the first trench portion has a radius $a_2$ that extends outwardly from the center of the core region toward the cladding region of approximately 18 micrometers to approximately 24 micrometers, and wherein the second trench portion has a radius $a_3$ that extends outwardly from the center of the trench region toward the cladding region to approximately 30 micrometers to approximately 45 micrometers.

42. The optical fiber of claim 37, wherein the optical fiber has a macrobending loss at 20 millimeter diameter that is less than or equal to approximately 10 decibels per meter (dB/m).

43. The optical fiber of claim 37, wherein the optical fiber has a dispersion of approximately 18 to 20 picoseconds per kilometer.nanometer (ps/km.nm).

44. The optical fiber of claim 37, wherein the optical fiber has a dispersion slope of approximately 0.060 to approximately 0.065 picoseconds per nanometer squared.kilometer (ps/nm$^2$/km).

45. The optical fiber of claim 37, wherein the optical fiber has a ratio of dispersion to dispersion slope (RDS) of approximately 0.003 nm$^{-1}$±–0.0005 nm$^{-1}$.

46. The optical fiber of claim 37, wherein the core region has a maximum relative refractive index of between approximately 0.25% and approximately 0.32%.

47. The optical fiber of claim 37, wherein the first portion of the trench region has a relative refractive index of approximately –0.08% to approximately –0.02%.

48. The optical fiber of claim 37, wherein the first portion of the trench region has a relative refractive index of approximately –0.02% to approximately 0.08%.

* * * * *